United States Patent [19]

Shank

[11] Patent Number: 5,442,159
[45] Date of Patent: Aug. 15, 1995

[54] METHOD OF INDUCTION BONDING JUXTAPOSED STRUCTURAL MEMBERS

[75] Inventor: Thomas J. Shank, Warren, Mich.

[73] Assignee: Robotron Corporation, Southfield, Mich.

[21] Appl. No.: 260,357

[22] Filed: Jun. 15, 1994

Related U.S. Application Data

[62] Division of Ser. No. 053,102, Apr. 26, 1993, Pat. No. 5,365,041.

[51] Int. Cl.[6] .............................................. H05B 6/40
[52] U.S. Cl. .................................... 219/633; 219/603; 156/272.4; 156/274.2
[58] Field of Search ............... 219/633, 616, 673, 672, 219/603; 156/273.9, 274.2, 272.4, 379.7, 380.2

[56] References Cited

U.S. PATENT DOCUMENTS

| | | | |
|---|---|---|---|
| 3,725,630 | 4/1973 | Gagliardi | 219/633 |
| 3,738,892 | 6/1973 | Curcio | 156/379.7 |
| 4,251,704 | 2/1981 | Masie et al. | 219/10.79 |
| 4,251,797 | 2/1981 | Pusateri et al. | 219/10.79 |
| 4,252,585 | 2/1981 | Raabe et al. | 156/69 |
| 4,293,363 | 10/1981 | Wakabayshi et al. | 156/272 |
| 4,363,946 | 12/1982 | Busemann | 219/10.59 |
| 4,602,139 | 7/1986 | Hutton et al. | 219/10.43 |
| 4,950,348 | 8/1990 | Larsen | 156/275.3 |
| 4,969,968 | 11/1990 | Leatherman | 219/633 |
| 5,001,319 | 3/1991 | Holmström | 219/10.61 R |
| 5,129,977 | 7/1992 | Leatherman | 156/272.4 |
| 5,260,535 | 11/1993 | Holmström et al. | 219/10.53 |

*Primary Examiner*—Philip H. Leung
*Attorney, Agent, or Firm*—Basile and Hanlon

[57] ABSTRACT

A method of bonding two structural members, such as two metal sheets, by heating a bonding material disposed between juxtaposed perimeter edges of the two sheets. An induction heater is disposed adjacent one sheet surface and adjacent the juxtaposed perimeter edges of the two sheets to induce heat to the bonding material from one surface of one sheet and from the perimeter edges of both sheets to cure the bonding material. The induction heater is formed of first and second elements disposed in a non-parallel arrangement adjacent one surface and along one perimeter edge of two juxtaposed structural members. The first and second elements are joined together at adjacent ends. A base and a riser are connected to intermediate spaced ends of the first element for attaching the first element to a high frequency electrical current source.

19 Claims, 3 Drawing Sheets

METHOD OF INDUCTION BONDING JUXTAPOSED STRUCTURAL MEMBERS

This application is a DIVISION of application Ser. No. 08/053,102, filed on Apr. 26, 1993, U.S. Pat. No. 5,365,041.

BACKGROUND OF THE INVENTION

FIELD OF THE INVENTION

The present invention relates, generally, to apparatus for joining two structural sheets by heating a bonding material disposed between the juxtaposed edges of two metal sheets and, more specifically, to electrical heating apparatus for heating a bonding material to join two sheets together.

The use of a heat curable, adhesive bonding material to join two juxtaposed structural elements or metal sheets is widely used in the automotive industry. Such a bonding technique is employed for doors, deck lids, hoods and like assemblies in which two metal sheets or panels are arranged in an edge overlapping manner with a suitable bonding material placed between the two sheets before the edge of one sheet is hemmed over the adjacent edge of the other sheet. Heat is then applied to the bonding material to cure the material and form a high-strength joint between the two structural elements or sheets.

It is well-known that the assembly of automotive vehicles involves high production rates. As such, electric induction coils have been employed to provide the necessary heat to quickly cure the bonding material. Such induction coils carry a high frequency electrical current which generates a magnetic field and causes heating of the metal sheets, which heat is conducted to and cures the bonding material disposed between the two sheets. Since the hemmed perimeter areas of doors, deck lids, hoods and the like can be quite large, it is common to employ such induction coils at only selected locations along the length of any hem so as to spot cure the bonding material only at the locations of the induction coils. The remainder of the bonding material is cured at a later time during the assembly process, such as when the automotive vehicle passes through a paint oven. It is also known to use induction coils around the entire perimeter edge or edges of an assembly to cure all of the bonding material at one time.

A typical prior art induction coil for bonding applications is shown in FIG. 1. In this typical arrangement, an induction coil 10 is positioned below an insulating material support 12. The support 12 receives and supports a hemmed edge 13 of an outer sheet or panel 14 and an inner sheet or panel 16. A strip of adhesive bonding material 18 is disposed between the outer and inner sheets 14 and 16 prior to the hemming operation. The passage of a high frequency electrical current through the induction coil 10 generates a magnetic field which induces heat in the metal sheets 14 and 16, which heat is conducted to and cures the bonding material 18 in the area of the induction coil 10.

FIG. 2 depicts another typical induction coil which is described in greater detail in U.S. Pat. No. 4,950,348. The induction coil 20 includes a generally rectangular-shaped coil assembly having a pair of outwardly extending legs 22, only one being shown in FIG. 2, which are connected to a source of electrical power, such as a transformer, not shown. A riser 24 and mounting base 26 are connected to the coil 20 to provide a suitable mount for the coil 20. Cores 28 are disposed about selected portions of the coil 20 for concentrating the magnetic field generated by the coil 20. In use, the prior art coil 20, shown in FIG. 2, is disposed on only one side of a hem joint between two overlapping sheets, such as the sheets 14 and 16 shown in FIG. 1.

The use of a single induction coil, as shown in the prior art arrangements of FIGS. 1 and 2, requires long heating times to cure the bonding material to a sufficient strength. Further, since the single induction coil is located on only one side of the hemmed joint of two sheets, more heat is generated at one sheet than on the other sheet resulting in an uneven heating of the bonding material.

FIG. 3 depicts yet another prior art induction coil used in spot bonding applications. In this arrangement, which is described in greater detail in U.S. Pat. No. 4,602,139, a lower fixture 30 attached to any suitable tool or support, not shown, carries a first or lower induction coil 32 which is mounted in a block of electrically insulating material 34. The lower fixture 30 also supports the hemmed joint formed between a lower outer sheet 36 and an inner disposed upper sheet 38, with a strip of adhesive bonding material 40 disposed therebetween. An upper fixture 42 supports a second or upper induction coil 44 which is also mounted in a block of electrical insulating material 46 in the upper fixture 42. The upper fixture 42 and the lower fixture 30 are movable with respect to each other so as to be separated, from each other to permit the mounting or removal of the hemmed sheets 36 and 38 between the two fixtures.

In one mode of operation, the upper fixture 42 is lowered over the hemmed sheets 36 and 38 to place the second induction coil 44 above one surface of the hemmed edge of the sheets 36 and 38. The first or lower induction coil 32 is positioned substantially in line with the second coil 44, but is located below the hemmed edges of the sheets 36 and 38. The use of two induction coils 32 and 44 on opposite sides of the hemmed joint of the sheets 36 and 38 creates a more even heating of the bonding material 40 since heat is applied to the sheets 36 and 38 from both sides at the same time. However, the design of the tooling in this arrangement is more complicated since at least one of the fixtures, such as the upper fixture 42, must be movable with respect to the other fixture to permit the mounting and removal of the hemmed sheets 36 and 38 therebetween.

Thus, it would be desirable to provide a novel induction bonding apparatus and method which cures a bonding material to a suitable strength in less time than in prior art bonding applications. It would also be desirable to provide an induction bonding apparatus and method which simplifies the design of tooling employed in such bonding applications. It would also be desirable to provide an induction bonding apparatus and method which creates a high strength, cured bond between two sheets or panels in less time than with previously devised heating apparatus for bonding applications.

SUMMARY OF THE INVENTION

The present invention is an induction bonding apparatus utilizing an electric induction coil for bonding applications. The induction coil is suited for bonding the overlapped or hemmed portions of two metal sheets by heating a heat curable bonding material disposed between the two sheets.

In a preferred embodiment, the induction heating coil of the present invention includes a first element arranged in a first plane. A second element is arranged in a second plane at a predetermined, non-parallel angle with respect to the first plane of the first element. In an exemplary embodiment, the second element is arranged substantially perpendicular to the first element and is located adjacent to one side edge of the first element in a generally L-shaped configuration.

The first and second elements are thus positioned to receive=the edge of a hemmed pair of sheets therebetween, with a lower surface of the outermost sheet disposed in proximity with the first element and the side edge of the hem of the two sheets disposed in proximity with the second element. This arrangement provides heating of the bonding material between the two sheets from the bottom and the side and even from the top thereby resulting in a more even heating of the bonding material and a faster cure time as compared to previously devised induction coil heating arrangements which provide for heating from only one side of the sheets or panels.

Although the first and second elements can be completely separate from each other, in one embodiment, the first element is provided with a first leg means formed of first and second spaced, co-linear leg portions. First and second end legs are joined to opposite ends of each of the first and second leg portions, respectively, and extend perpendicularly therefrom. The second element includes a second leg having third and fourth end legs respectively joined to opposite ends thereof and extending outward from the second leg. The first and second end legs are joined to the third and fourth end legs, respectively, to join the first and second elements together in a unitary structure forming a single turn induction coil.

A base means is connected to the first element for connecting the induction coil to a source of high frequency electrical current. Riser means are disposed between the base means and the first element. Preferably, separate base means and separate riser means are connected to each of the first and second leg portions of the first leg of the first element.

The first and second elements, the base means and the riser means are preferably formed of a hollow, tubular, electrically conductive material members, with an internal passage extending completely through the base means, the riser means and the first and second elements. The passage provides a coolant fluid flow path through the induction coil.

In addition,, core means are disposed in an encircling manner about the legs of the first and second elements to concentrate the magnetic field generated by the first and second elements.

According to the present invention, a unique method for bonding a first structural sheet to a second structural sheet is disclosed. The method comprises the steps of:

a) disposing an uncured, heat curable bonding material on one surface of a first sheet in a predetermined location with respect to a perimeter edge of the first sheet;
b) disposing a second sheet in a juxtaposed position with respect to the first sheet in contact with the bonding material and with a perimeter edge of the second sheet juxtaposed with the perimeter edge of the first sheet;
c) disposing induction heater means adjacent one surface of one of the first and second sheets and adjacent the juxtaposed perimeter edges of the first and second sheets; and
d) inducing heat from the induction heater means to the bonding material from one surface of one of the first and second sheets and from the juxtaposed perimeter edges of the first and second sheets to cure the bonding material between the first and second sheets and along the juxtaposed perimeter edges of the first and second sheets in the proximity of the induction heater means.

The method of the present invention may also include the step of hemming a perimeter edge of one of the first and second sheets about the juxtaposed perimeter edge of the other of the first and second sheets after the first and second sheets have been juxtaposed. According to the present method, the step of disposing induction heater means further comprises the steps of disposing a first element of an induction coil in a first plane adjacent a surface of one of the first and second sheets, disposing a second element of the induction coil in a second plane at a predetermined, non-parallel angle with respect to the first plane of the first element in proximity with the juxtaposed edges of the first and second sheets, and supplying high frequency electrical current to the first and second elements to induce heating of the bonding material between the first and second sheets.

The induction coil and method of the present invention provides significant advantages over previously devised induction coils and induction heating methods for bonding applications. The L-shaped arrangement of the first and second elements of the induction coil of the present invention provides more even and faster heating of the bonding material disposed between two juxtaposed sheets. Such heat is generated through the one surface of one of the sheets as well as through the side edges of the other sheet to cure the bonding material more quickly than in previous induction coil arrangements which have only a single coil located below the hemmed joint of two sheets.

The L-shaped induction coil of the present invention also simplifies the construction of production tooling since the hemmed joint of two sheets may be easily mounted in proximity with the induction coil and removed therefrom without the need for moving one coil and its mounting fixture toward or away from the other coil as in prior art induction coil arrangements having two opposed, parallel induction coils mounted on opposite sides of the two hemmed sheets.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Figure 4:
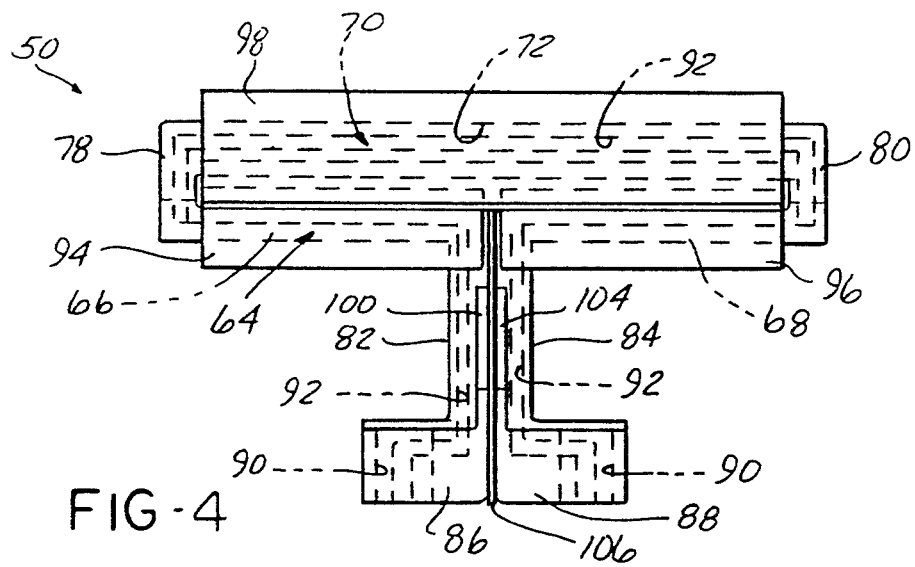
FIG. 4 is a front elevational view of a preferred embodiment of the induction coil of the present invention.
Figure 5:
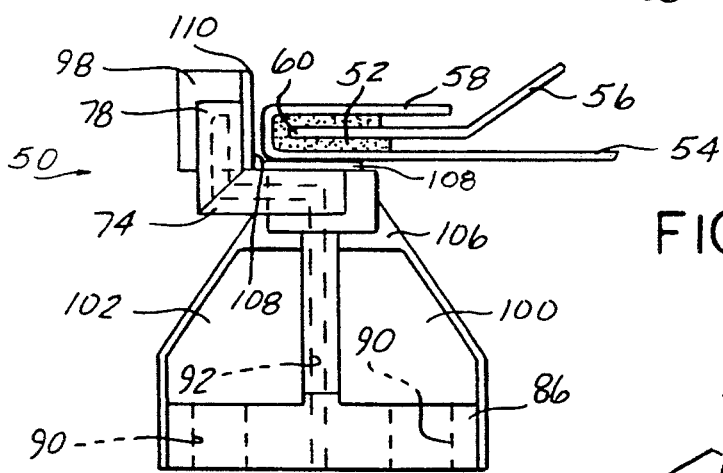
FIG. 5 is an end elevational view of the induction coil shown in FIG. 4.
Figure 6:
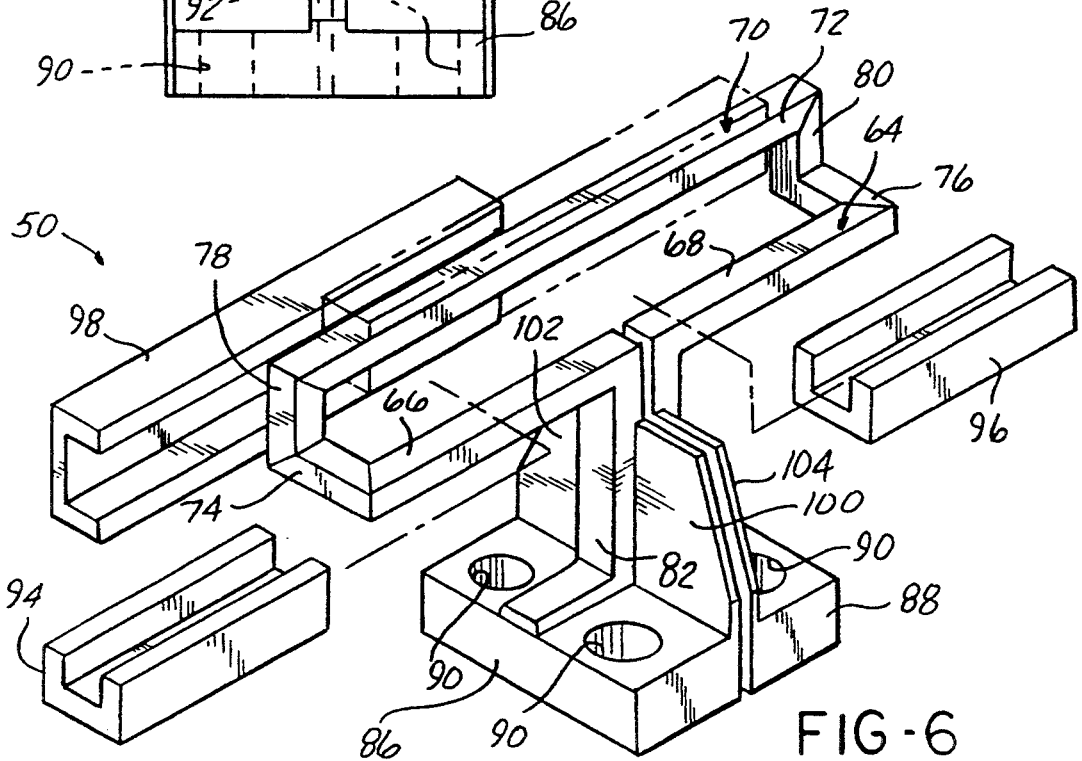
FIG. 6 is an exploded, perspective view of the induction coil shown in FIG. 4.

Referring now to FIGS. 4, 5 and 6, there is depicted a preferred embodiment of an electric induction heating coil 50 according to the present invention. The induction coil 50 is devised to heat a strip, bead or spot of adhesive bonding material 52 disposed between a juxtaposed arrangement of outer structural element or metal sheet 54 and an inner structural element or metal sheet 56. As shown in FIG. 5, the outer edge 58 of the lower sheet 54 is hemmed around the outer edge 60 of the inner sheet 56. Prior to the hemming operation, the strip, bead or spot 52 of bonding material is applied to one surface of the lower sheet 54, with the edge 60 of the inner sheet 56 then brought into contact therewith. During the hemming of the outer edge 58 of the lower sheet 54 about the edge 60 of the inner sheet 56, portions of the bonding material 52 will be squeezed around the side edge 60 of the inner sheet 56 and onto the opposed surface of the inner sheet 56 between the inner sheet 56 and the outer edge 58 of the outer sheet 54.

In one embodiment, the induction coil 50 includes a first element 64 having first and second, co-linear leg portions 66 and 68. The first and second leg portions 66 and 68 are arranged in a straight line and spaced apart by a small distance, as shown in FIGS. 4 and 6.

The induction coil 50 also includes a second element 70 formed of a second leg 72. The second element 70 is disposed at a predetermined, non-parallel angle with respect to the first element 64. Preferably, the plane of the second element 70 is arranged substantially perpendicular to the plane of the first element 64. This enables the first element 64 to be disposed adjacent one surface of the hem between the two sheets 54 and 56; while the second element 70 is disposed adjacent to the edge of the hemmed joint of the two sheets 54 and 56, as shown in FIG. 5.

The first and second elements 64 and 70 are provided in any desired length for spot bonding of a small length of the bonding material 52 or for bonding the entire peripheral edge of an assembly.

Means are provided for joining the first and second elements 64 and 70 into a single turn induction coil. The joining means preferably comprises first and second end legs 74 and 76 which are integrally formed with or joined to the first and second leg portions 66 and 68, respectively, of the first element 64. As shown in FIG. 6, the first and second end legs 74 and 76 are brazed to one end of the first and second leg portions 66 and 68, respectively. The first and second end legs 74 and 76 lie in the same first plane as the first and second leg portions 66 and 68 of the first element 64. Third and fourth end legs 78 and 80, respectively, are integrally formed with or joined to the leg 72 of the second element 70. In an exemplary embodiment, the third and fourth end legs 78 and 80 are brazed to opposite ends of the leg 72 forming the second element 70 and lie in the same second plane as the second element 70. Further, the first and second end legs 74 and 76 are joined, such as by brazing, to the third and fourth legs 78 and 80, respectively, to integrally connect the first and second elements 64 and 70 together. This places the first and second elements 64 and 70 in a substantially L-shape configuration suited for easily receiving the hemmed joint of the two metal sheets 54 and 56 in close proximity therewith.

In an exemplary construction, riser means in the form of first and second risers 82 and 84 are joined to the first and second leg portions 66 and 68, respectively, of the first element 64 and extend substantially perpendicularly therefrom. The first and second riser members 82 and 84 are connected to or integrally formed with first and second base members 86 and 88, respectively, which form a base means for connecting the induction coil 50 to a source of high frequency, electrical current, such as a conventional transformer, electric bus bars, etc., not shown. Mounting apertures 90 are formed in the first and second base members 86 and 88 to receive fasteners to mount the induction coil 50 to the source of electrical current.

Ribs 100 and 102 are integrally formed with and extend between the first base member 86 and opposite sides of the first riser member 82, as shown in FIGS. 4, 5 and 6. A similar pair of ribs 104 are also provided between the second base member 88 and opposite sides of the second riser 84. In addition, a layer of electrical insulating material 106, such as a plastic, is disposed between the spaced portions of the ribs 100, 102 and 104, the first and second riser members 82 and 84 and the facing portions of the first and second legs 66 and 68 of the first element 64 to provide electrical insulation between such elements.

All of the component parts of the first and second elements 64 and 70, as well as the first and second riser members 82 and 84 and the first and second base members 86 and 88, are formed of an electrically conductive material, such as copper. Further, all of the components of the first and second elements 64 and 70 and the first and second riser members 82 and 84 are formed as hollow, tubular members having an internal passage denoted generally by reference number 92, extending therethrough. The passage 92 opens through each of the base members 86 and 88 and extends through the entire induction coil 50 to provide a coolant fluid flow path when the ends of the passage 92 in the base members 86 and 88 are connected to a source of coolant fluid. The flow of coolant fluid through the induction coil 50 removes heat from the induction coil 50.

The integral connection of the first and second elements 64 and 70 by the respective first and second end legs 74 and 76 and the third and fourth end legs 78 and 80 forms a single turn induction coil which generates a magnetic field when a high frequency electrical current is passed therethrough. The magnetic field causes heating of the metal sheets 54 and 56 in the areas of the first and second elements 64 and 70 which heat is conducted through the sheets 54 and 56 to the bonding material 52 disposed therebetween. The application of heat for a predetermined amount of time partially or fully cures the bonding material 52 at least in the proximity of the induction coil 50. Due to the L-shaped arrangement of the first and second elements 64 and 70 of the induction coil 50 of the present invention, curing of the bonding material 52 to a solid, high strength state is achieved much quicker than in previously devised single induction coil apparatus for spot bonding applications since heat is applied from the bottom surface of the hemmed joint as well as from the side edge of the hemmed joint. Heat radiated from the side edge also heats any bonding material disposed above the inner sheet 56 and the overlapped outer edge 58 of the outer sheet 54. Thus, heating of the bonding material 52 occurs simultaneously in three locations thereby substantially reducing the time required to cure the bonding material to a high strength state. It has also been found that such heating of the bonding material from two sides, as shown in FIG. 5, and described above, creates an increased level of strength in the bonding material as compared to heating from only one side as in the prior art induction coils described above.

Figure 1:
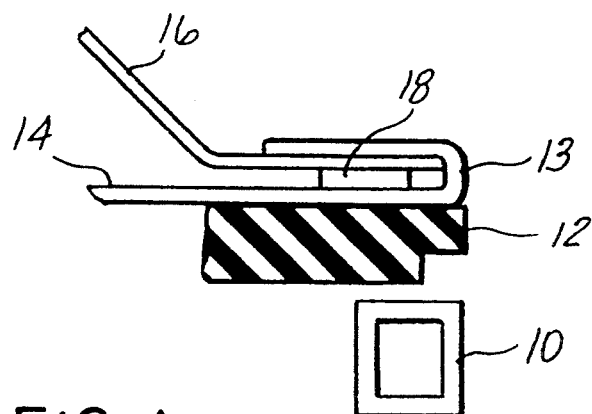
FIG. 1 is a side elevational view of a first prior art induction coil for spot bonding applications.
Figure 2:
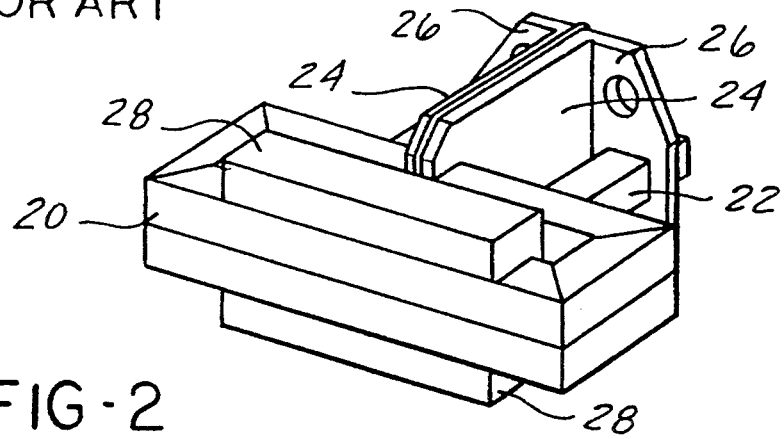
FIG. 2 is a perspective view of a second prior art induction coil for spot bonding applications.
Figure 3:
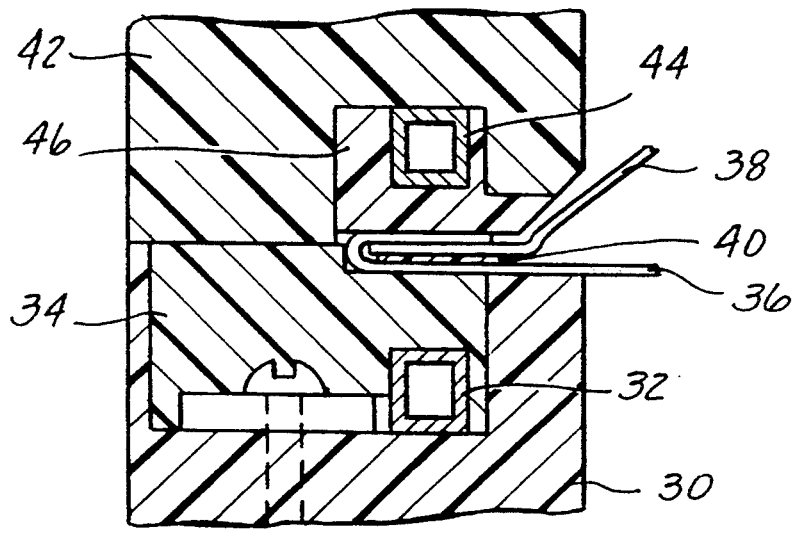
FIG. 3 is a cross,-sectional, side view of a third prior art induction coil having an opposed, spaced pair of induction coils.

For example, electrical current at frequencies of between 3 to 30 kHz through the induction coil 50 can generate temperatures of between 250° to 450° in the bonding material 52. Depending on the amount of heating time and the resulting cure temperature at the sheets 54 and 56, the L-shaped induction coil 50 of the present invention has been found to demonstrate up to a 500% improvement in cure strength of the bonding material 52 over the single coil apparatus shown in FIGS. 1 and 2.

Concentrating magnetic cores may be provided about predetermined portions of the first and second elements 64 and 70 for concentrating the magnetic field generated by the first and second elements 64 and 70. By way of example, first and second U-shaped magnetic cores 94 and 96 are mounted about and joined to the first and second leg portions 66 and 68 of the first element 64. Similarly, an elongated U-shaped magnetic core 98 is disposed about the leg 72 of the second element 70.

Finally, the induction coil 50 is provided with protective elements 108 and 110 which are fixedly attached to the first, element 64 and the second element 70 and provide a suitable protective surface which prevents contact of the outer panel 54 of the hemmed sheets 54 and 56 with, the first and second elements 64 and 70. The sheets 54 are supported by suitable fixtures or tooling, not shown, so as to be in close proximity with but not contacting the induction coil 50.

In use, a strip of bonding material 52 will be initially applied to the outer panel 54 at a location spaced from the perimeter edge 58 of the outer panel 54. The inner panel 56 is then brought into a juxtaposed position with respect to the outer panel 54 and contacts the strip of bonding material 52. The outer edge 58 of the outer sheet 54 is then bent or hemmed around the outer edge 60 of the inner sheet 56 to create a hem joining the two sheets 54 and 56 together. The hemmed joint is then disposed in proximity with the induction coil. With coolant fluid flowing through the internal passage 92 in induction coil 50, a high frequency current is applied to the induction coil 50. This current induces a magnetic field which causes heating of the metal panels 54 and 56 in locations immediately adjacent the first and second elements 64 and 70 of the induction coil 50. Such heat is conducted to the bonding material 50 and cures the bonding material 52 to a high strength solid state thereby joining the two sheets 54 and 56 together. The joined first and second sheets 54 and 56 are then removed from the induction coil 50.

Figure 7:
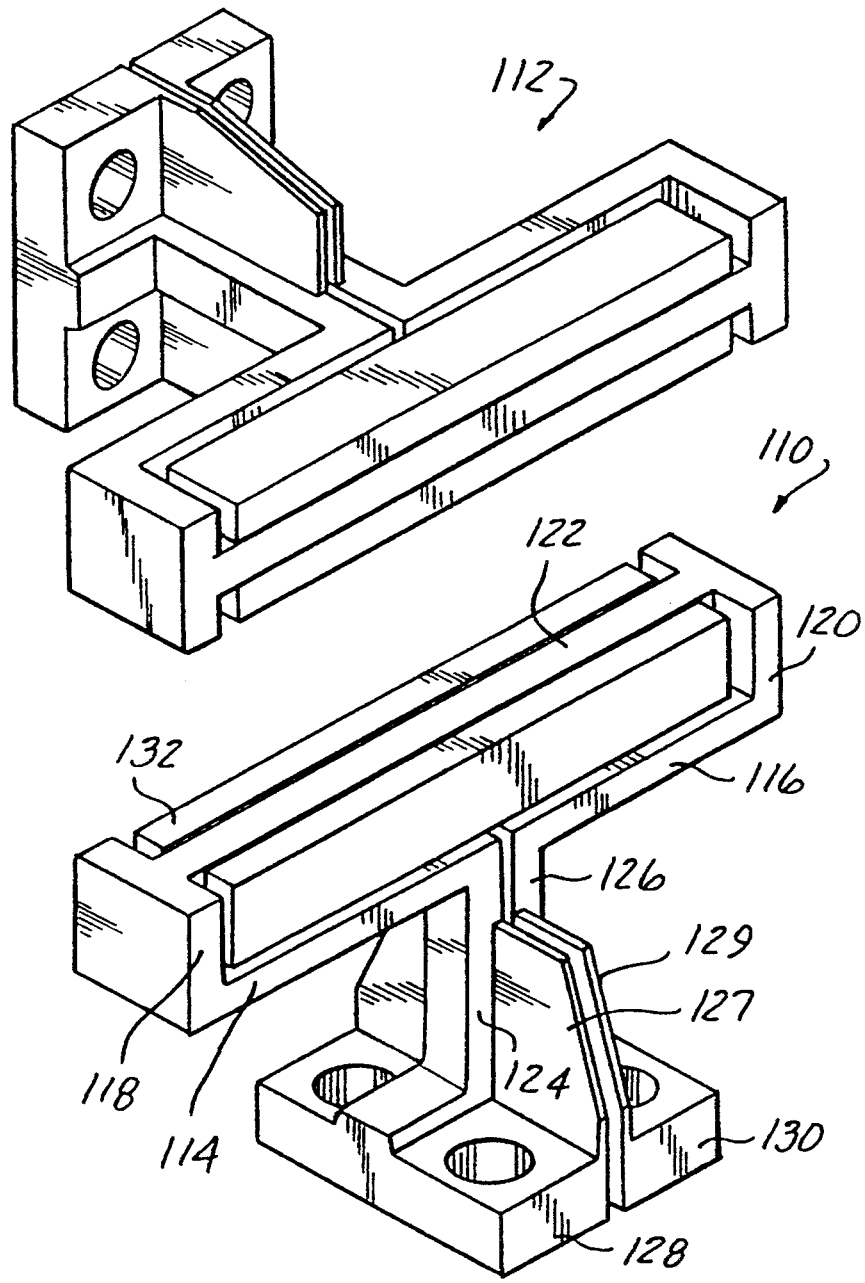
FIG. 7 is a perspective view of another embodiment of the induction coil of the present invention.

FIG. 7 depicts another embodiment of the present invention in which separate, identical induction coils 110 and 112 are disposed in a substantially perpendicular orientation with respect to each other to receive a hemmed joint of two sheet metal panels, such as sheet metal panels 54 and 56, described above, therebetween in the same manner as the induction coil 50. As both of the induction coils 110 and 112 are identical, the following description will be provided only for induction coil 110, ill being understood that induction coil 112 is similarly constructed.

The induction coil 110 includes a first element formed of first and second lower legs 114 and 116 which are respectively connected to end legs 118 and 120. An elongated upper leg 122 extends between the opposite ends of the end legs 118 and 120. The legs 114, 116, 118, 120 and 122 are integrally formed or joined together, such as by brazing, to form the single turn induction coil 110. First and second riser members 124 and 126 are joined to and extend perpendicularly from the legs 114 and 116 and are each connected to base members 128 and 130. Ribs 127 and 129 are connected between the riser 134 and the base member 128 and between the riser 126 and the base member 130, respectively. Suitable insulation may be placed between facing surfaces of the riser members 124 and 126 and the base members 128 and 130, as described above and shown in FIG. 5. A concentrating magnetic core 132 is disposed about the leg 122 to concentrate the magnetic field generated by the induction coil 110.

An internal coolant path may be formed in each of the legs, risers and base of each induction coil 110 and 112 as described above for the flow of coolant fluid through the induction coil 110 during the operation thereof.

The embodiment shown in FIG. 7 which is formed of two separate, perpendicularly arranged induction coils 110 and 112 functions in the same manner as the induction coil 50 described above and shown in FIGS. 4–6. The first induction coil 110 will be positioned adjacent one surface of the hemmed joint of two sheets 54 and 56; while the second induction coil 112 is disposed adjacent the side edge of the hemmed joint of the two sheets 54 and 56. The simultaneous flow of high frequency electrical current through each of the induction coils 110 and 112 generates magnetic fields which cause heating of the metal sheets 54 and 56 and the resulting heating and subsequent curing of the bonding material disposed therebetween.

In summary, there has been disclosed a unique induction coil and method for heating and curing a bonding material disposed between two juxtaposed metal sheets. The induction coil of the present invention includes a unique non-parallel, preferably L-shaped, substantially perpendicular arrangement of first and second elements which applies heat to the bonding material simultaneously from one surface of the two sheets and from a side edge surface thereby creating a more even and much quicker heating and subsequent curing of the bonding material to a high strength solid state. The L-shaped arrangement of the elements also simplifies the design of production tooling since the hemmed joint of two metal sheets may be easily placed on and removed from the induction coil without the requirement of moving parts to bring one induction coil into engagement with one surface of the hemmed joint.

What is claimed is:

1. A method of bonding a first metal sheet to a second metal sheet comprising the steps of:
   disposing an uncured, heat curable bonding material on one surface of the first metal sheet in a predetermined location with respect to a perimeter edge of the first metal sheet;
   disposing the second metal sheet in a juxtaposed position with respect to the first metal sheet in contact with the bonding material, with a perimeter edge of the second metal sheet juxtaposed with the perimeter edge of the first metal sheet;

disposing induction heater means adjacent one surface of one of the first and second metal sheets and adjacent the juxtaposed perimeter edges of the first and second metal sheets; and inducing heat from the induction heater means to the bonding material from one surface of one of the first and second metal sheets and from the juxtaposed perimeter edges of the first and second metal sheets to cure the bonding material between at least the first and second metal sheets and along the juxtaposed edges of the first and second metal sheets in proximity with the induction heater means.

2. The method of claim 1 further comprising the step of:

hemming the perimeter edge of one of the first and second sheets about the juxtaposed perimeter edge of the other of the first: and second metal sheets after the first and second metal sheets have been disposed in a juxtaposed relationship.

3. The method of claim 1 wherein the step of disposing induction heater means further comprises the steps of:

disposing a first element of an induction heating coil in a first plane adjacent one surface of one of the first and second juxtaposed metal sheets; and disposing a second element of an induction heating coil adjacent the juxtaposed edges of the first and second metal sheets.

4. The method of claim 3 wherein the step of disposing induction heater means further comprises the step of:

disposing magnetic cores encirclingly about portions of the first and second elements to concentrate the magnetic field produced by the first and second elements.

5. The method of claim 3 wherein the step of disposing induction heater means further comprises the step of:

disposing protective surface means on the first and second elements to provide a protective surface for mounting the first and second metal sheets respectively thereon.

6. The method of claim 3 wherein the step of disposing induction heater means further comprises the steps of:

forming the first and second elements with a first leg, first and second end legs joined to opposite ends of the first leg, and third and fourth legs spaced from the first leg and joined to the first and second end legs, respectively;

arranging the first leg, the second and third end legs, and the third and fourth legs of each of the first and second elements co-planarly for each respective first and second element; and connecting a high frequency electrical current source to each of the first and second elements.

7. The method of claim 3 the step of disposing induction heater means further comprises the step of:

joining the first and second elements together to form a single turn coil.

8. The method of claim 7 wherein the step of disposing induction heater means further comprises the steps of:

connecting a base mounting the induction heating coil to a source of high frequency, electrical current; and connecting a riser to the base and to the first element.

9. The method of claim 8 wherein the step of disposing induction heater means further comprises the step of:

forming the first and second elements and the riser of hollow, tubular members.

10. The method of claim 7 wherein the step of disposing inducting heating means further comprises the step of:

forming end legs on each of the first and second elements, each end leg connected to an end leg of the other of the first and second elements.

11. The method of claim 7 wherein the step of disposing induction heater means further comprises the steps of:

forming the first element with a first leg and first and second end legs perpendicularly joined to opposed ends of the first leg;

forming the second element with a second leg and third and fourth end legs respectively joined to and extending perpendicularly from opposite ends of the second leg; and connecting the first and second end legs respectively to the third and fourth end legs to join the first and second elements in a single turn coil.

12. The method of claim 11 wherein the step of disposing induction heater means further comprises the step of:

forming fluid flow paths in the first and second elements for the flow of coolant fluid through the first and second elements.

13. The method of claim 11 wherein the step of disposing induction heater means further comprises the step of:

mounting magnetic cores about the first leg of the first element and about the second leg of the second element to concentrate the magnetic-field generated by the first and second elements.

14. The method of claim 11 wherein the step of disposing induction heater means further comprises the step of:

forming the first leg of the first element with first and second co-planar, spaced leg portions.

15. The method of claim 14 wherein the step of disposing induction heater means further comprises the steps of:

arranging first and second spaced base members side-by-side; and connecting first and second risers to the first and second base members, respectively, and to the first and second leg portions, respectively, of the first element.

16. The method of claim 15 wherein the step of disposing induction heater means further comprises the steps of:

co-planarly disposing the first and second spaced leg portions of the first leg of the first element; and serially connecting the first base member, the first riser, the first leg portion, the first end leg, the third end leg, the second leg, the fourth end leg, the second end leg, the second leg portion, the second riser and the second base member in a continuous single coil turn.

17. The method of claim 15 wherein the step of disposing induction heater means further comprises the step of:

disposing insulating means between the first and second risers, the first and second base portions and the first and second leg portions of the first element.

18. The method of claim 3 wherein the step of disposing induction heater means further comprises the step of:

disposing the second element in a second substantially non-parallel plane with respect to the first plane of the first element.

19. The method of claim 18 wherein the second plane of the second element is substantially perpendicular to the first plane of the first element.

* * * * *